United States Patent [19]
Rice

[11] Patent Number: 5,707,101
[45] Date of Patent: Jan. 13, 1998

[54] REPLACEMENT MODULE FOR REPLACING STRUCTURE AT THE REAR OF AN AUTOMOBILE

[76] Inventor: Darin B. Rice, 9330 Moore Rd., Pleasant Grove, Calif. 95668

[21] Appl. No.: 429,924

[22] Filed: Apr. 27, 1995

[51] Int. Cl.⁶ .................... B60J 1/18; B62D 25/08
[52] U.S. Cl. .............. 296/195; 296/37.8; 296/146.15; 296/196; 296/201; 52/204.69
[58] Field of Search .............. 296/10, 37.1, 37.8, 296/146.15, 146.16, 147, 195, 196, 197, 201; 49/463; 52/204.62, 204.66, 204.69, 208

[56] References Cited

U.S. PATENT DOCUMENTS

| | | | |
|---|---|---|---|
| 2,352,727 | 7/1944 | McMahon | 49/463 |
| 2,836,457 | 5/1958 | Beerman et al. | |
| 3,413,031 | 11/1968 | Gafvert et al. | |
| 3,770,312 | 11/1973 | Shadburn | 296/146.16 |
| 4,305,614 | 12/1981 | Holk et al. | |
| 4,315,653 | 2/1982 | Sparling | |
| 4,337,976 | 7/1982 | Lapine et al. | 296/195 |
| 4,358,151 | 11/1982 | Wood | |
| 4,566,728 | 1/1986 | Theodore | |
| 4,828,315 | 5/1989 | Muirhead | 296/10 |
| 4,842,326 | 6/1989 | DiVito | 296/196 |
| 4,852,935 | 8/1989 | Varner | |
| 4,877,283 | 10/1989 | Little et al. | |
| 4,887,859 | 12/1989 | Aper | 296/196 |
| 5,000,501 | 3/1991 | Cunha | 296/195 |
| 5,513,891 | 5/1996 | Horiuchi | 296/37.1 |

FOREIGN PATENT DOCUMENTS

| | | | |
|---|---|---|---|
| 2-114017 | 4/1990 | Japan | 296/201 |

*Primary Examiner*—Dean Kramer
*Attorney, Agent, or Firm*—Thomas R. Lampe

[57] ABSTRACT

A replacement module for replacing structure at the rear of an automobile includes a substantially rigid frame member, a module window positionable on the frame member to cover a window opening defined by the frame member, and connector structure for releasable connecting the module window to the frame member with the module window covering the window opening. A pocket is incorporated in the module to retain the module window when the module window is removed from the window opening.

18 Claims, 4 Drawing Sheets

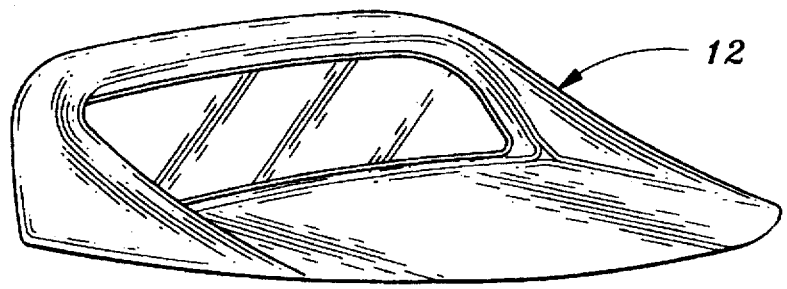
Fig. 1
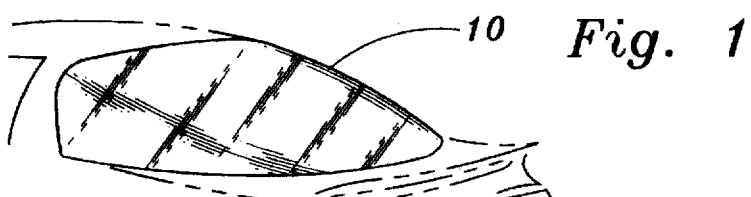
Fig. 2
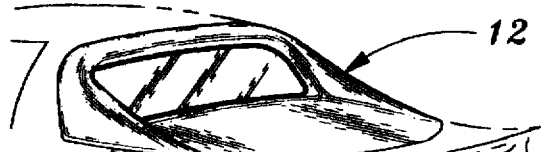
Fig. 3
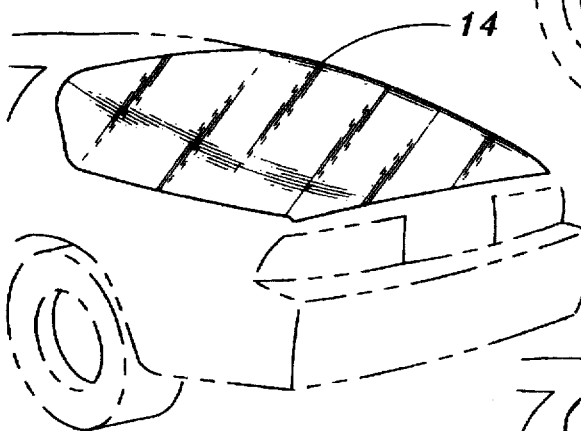
Fig. 4
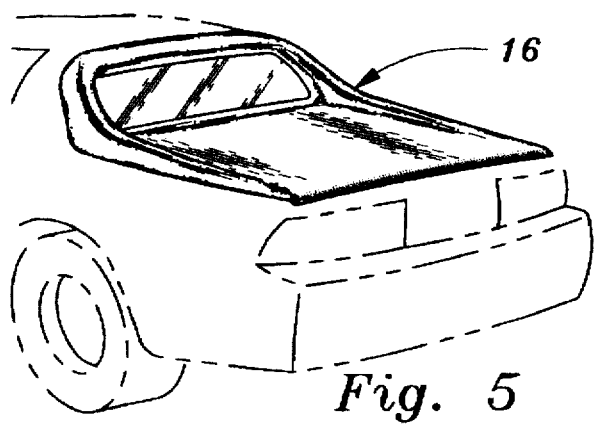
Fig. 5

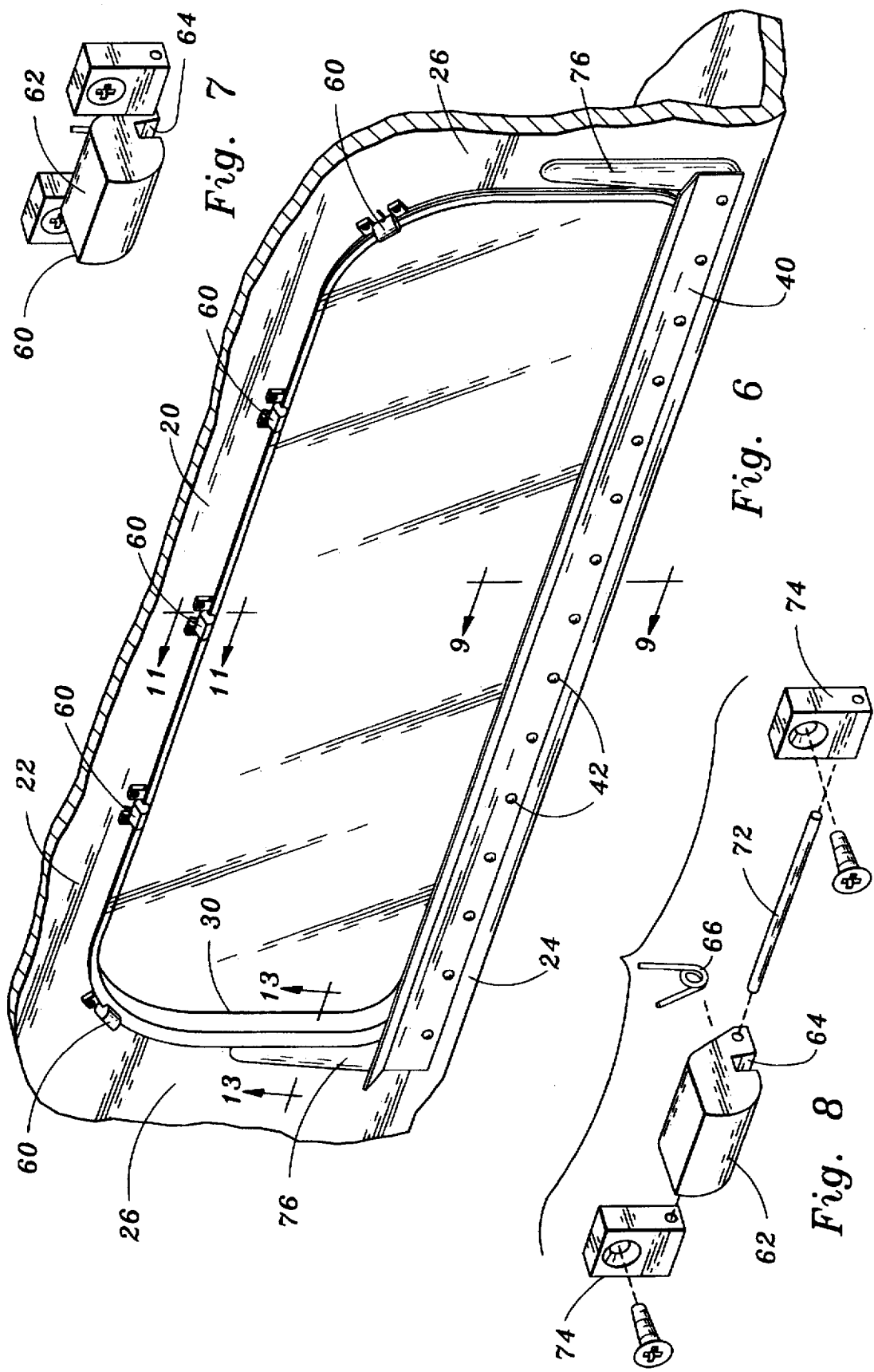

5,707,101

REPLACEMENT MODULE FOR REPLACING STRUCTURE AT THE REAR OF AN AUTOMOBILE

TECHNICAL FIELD

This invention relates to a replacement module including a module window for replacing structure at the rear of an automobile at least partially comprising the rear window of the automobile. In other words, the replacement module can replace either the original automobile window per se or a hatchback including a hatchback rear window.

BACKGROUND ART

It is known to customize or modify the appearance of automobiles by replacing certain components thereof with other components. For example, it is known to remove whole body parts of an automobile and replace them with body parts of differing configurations to provide a more attractive or desirable appearance.

U.S. Pat. No. 4,305,614, issued Dec. 15, 1981, for example, discloses a convertible vehicle body having a quick-release hinge mechanism for an ingress or egress opening closure or door at the body rear end to facilitate the interchange of different rear end structures without tools or special equipment to obtain optional rear end appearances and functions.

Other patents considered representative of the state of the prior art are the following U.S. patents: U.S. Pat. No. 4,566,728, issued Jan. 28, 1986, U.S. Pat. No. 4,358,151, issued Nov. 9, 1982, U.S. Pat. No. 4,877,283, issued Oct. 31, 1989, U.S. Pat. No. 2,836,457, issued May 27, 1958, U.S. Pat. No. 4,85,935, issued Aug. 1, 1989, U.S. Pat. No. 3,413,031, issued Nov. 26, 1968, and U.S. Pat. No. 4,315,653, issued Feb. 16, 1982.

DISCLOSURE OF INVENTION

The present invention relates to a replacement module for an original automobile rear window or for a hatchback construction comprising part of the original automobile structure.

The replacement module of the present invention incorporates unique structure which allows for either ready attachment of a module window to the rest of the replacement module structure or ready removal therefrom, as desired by the operator. Such an arrangement is not disclosed in the known prior art.

The invention includes a substantially rigid frame member for attachment to an automobile body. The frame member has a top frame element, a bottom frame element, and two spaced side frame elements extending between the top frame element and the bottom frame element. The frame elements define a window opening.

A module window is selectively positionable on the frame member to cover the window opening.

Connector means is provided for releasably connecting the module window to the frame member with the module window covering the window opening.

The module window is selectively removable from the frame member whereby the window opening is not covered by the module window. The replacement module additionally comprises means for accommodating and storing the module window.

The connector means allows quick and ready removal of the module window or placement of the module window to cover the window opening, as desired. The invention also includes seal means for ensuring a fluid-tight seal between the module window and the rest of the replacement module structure when the module window is in place and covers the window opening.

Other features, advantages, and objects of the present invention will become apparent with reference to the following description and accompanying drawings.

BRIEF DESCRIPTION OF DRAWINGS

FIG. 1 is a rear perspective view of a replacement module constructed in accordance with the teachings of the present invention;

FIG. 2 illustrates an automobile including the original rear window thereof;

FIG. 3 is a perspective view of the automobile of FIG. 2 but illustrating the replacement module of FIG. 1 in position on the automobile as a replacement for the original window;

FIG. 4 illustrates another automobile design including a hatchback;

FIG. 5 illustrates a replacement module constructed in accordance with the teachings of the present invention in position on the automobile of FIG. 4 as a replacement for the original hatchback;

FIG. 6 is a perspective view illustrating structural details of a replacement module constructed in accordance with the teachings of the present invention and illustrating in particular a module window in place on a frame member of a replacement module;

FIG. 7 is an enlarged perspective view of a clip utilized when connecting the module window to the frame member;

FIG. 8 is an exploded perspective view of the clip of FIG. 7;

PREFERRED MODES FOR CARRYING OUT THE INVENTION

Figures 9, 10:
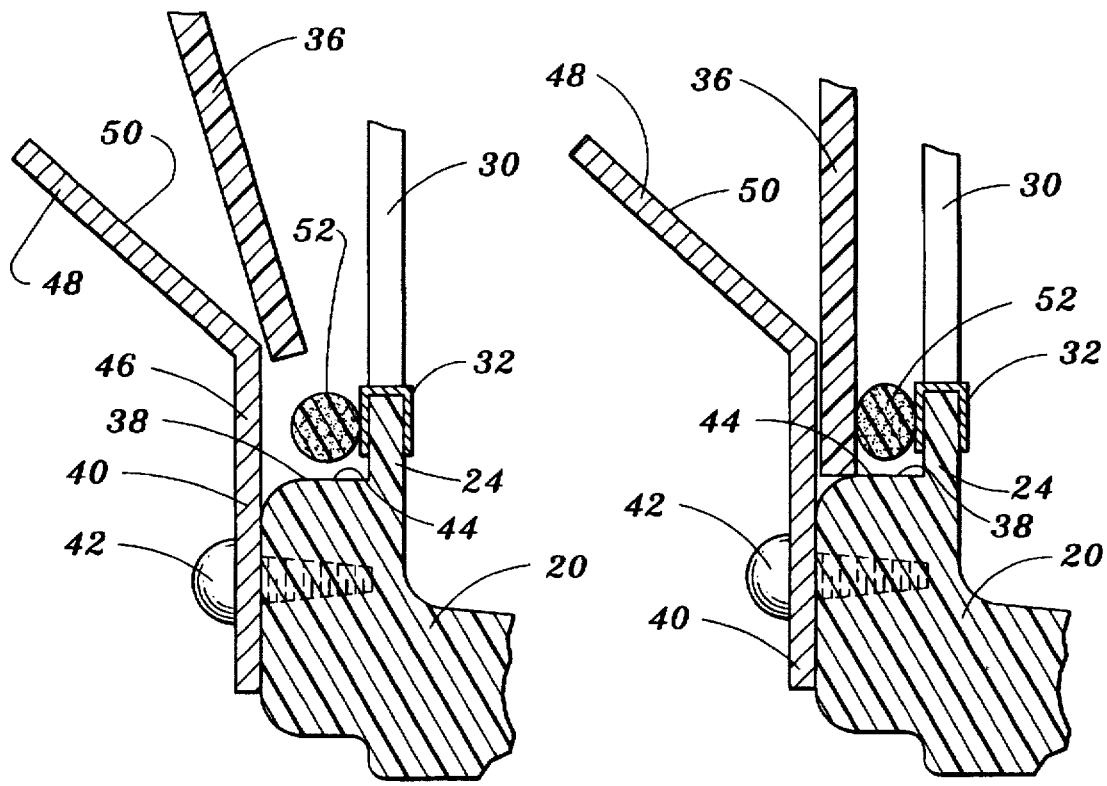
FIG. 9 is a greatly enlarged cross-sectional view taken along the line 9—9 of FIG. 6 and illustrating the bottom of a module window being positioned for placement on the frame member to cover a window opening defined by the frame member.
FIG. 10 is a view similar to FIG. 9 but illustrating the position assumed by the module window when in place on the frame member.

An automobile having a rear window 10 to be replaced by a replacement module constructed in accordance with the teachings of the invention is shown in FIG. 2. The replacement module of FIG. 1 is to be employed for such purpose and such module is identified by reference numeral 12. FIG. 3 illustrates replacement module 12 in position on the automobile in place of rear window 10.

FIG. 4 discloses an automobile having an original equipment hatchback 14. An alternative configuration of replacement module constructed in accordance with the teachings of the present invention employed as a replacement for the hatchback is shown in position on the hatchback automobile in FIG. 5 replacing the hatchback. This replacement module is identified by reference numeral 16.

The particular manner of attachment of the replacement module to the vehicle does not comprise part of the present invention and need not be described herein. Any suitable mechanical fastener means known in the prior art may be utilized to effect such attachment.

The principles of the present invention can be applied to any replacement module configuration. Replacement module 12 employed to replace an automobile rear window has an outer periphery substantially corresponding in shape and size to the outer periphery of the automobile rear window. The replacement module 16 employed to replace an automobile hatchback has an outer periphery substantially corresponding in shape and size to the outer periphery of the automobile hatchback. In other words, the size and shape of the replacement module is dictated by the size and shape of the structure being replaced.

Referring now to FIGS. 6–15, the particular features of the present invention are illustrated in connection with replacement module 12; however, it will be appreciated that the structure is also applicable to other replacement module configurations.

Replacement module 12 includes a substantially rigid frame member 20 which may be, for example, of molded plastic or fiberglass construction. Frame member 20 has a top frame element 22, a bottom frame element 24, and two spaced side frame elements 26 extending between the top frame element and the bottom frame element. The frame elements are of integral construction and define a window opening 30. In the disclosed arrangement, trim 32 is disposed about all or a part of the frame member about the window opening.

The replacement module additionally includes a module window, conventionally of glass or a clear plastic sheet material, designated by reference numeral 36. Module window 36 is for the purpose of covering window opening 30 as shown in FIG. 6, for example. The module window may, however, be completely removed from the rest of the replacement module to completely open the window opening to provide free flow of air into the interior of the automobile to which the replacement module has been applied.

Bottom frame element 24 protrudes outwardly on the inner side thereof to provide an abutment surface 38 engageable by the bottom of the module window as illustrated in FIG. 10 to abut against and support the module window when the module window is in place on the frame member with the module window covering the window opening.

An elongated retainer element 40 is affixed by screws 42 to bottom frame element 24 and the retainer element extends along the length of the window opening. The retainer element is spaced from and is adjacent to the bottom frame element along a portion thereof to define a cavity 44 with the bottom frame element, as may perhaps best be seen with reference to FIGS. 9 and 10.

Retainer element 40 includes a first retainer element segment 46 extending substantially parallel to the module window at the cavity when the module window abuts and is supported by the abutment surface 38 and covers the window opening. A second retainer element segment 48 is affixed to the first retainer element segment and flares outwardly away from the cavity, as shown. Segment 48 has a guide surface 50 slanting toward the cavity to guide placement of the module window into the cavity.

A resilient, deformable seal strip 52 is connected to top frame element 22, bottom frame element 24 and side frame elements 26 closely adjacent to the window opening. The seal strip will be compressed between the module window and the frame member to form a fluid-tight seal therebetween when the module window is secured in place on the frame member and covers the window opening. FIG. 10 shows the seal strip 52 under compression under such circumstances.

Figures 11, 12:
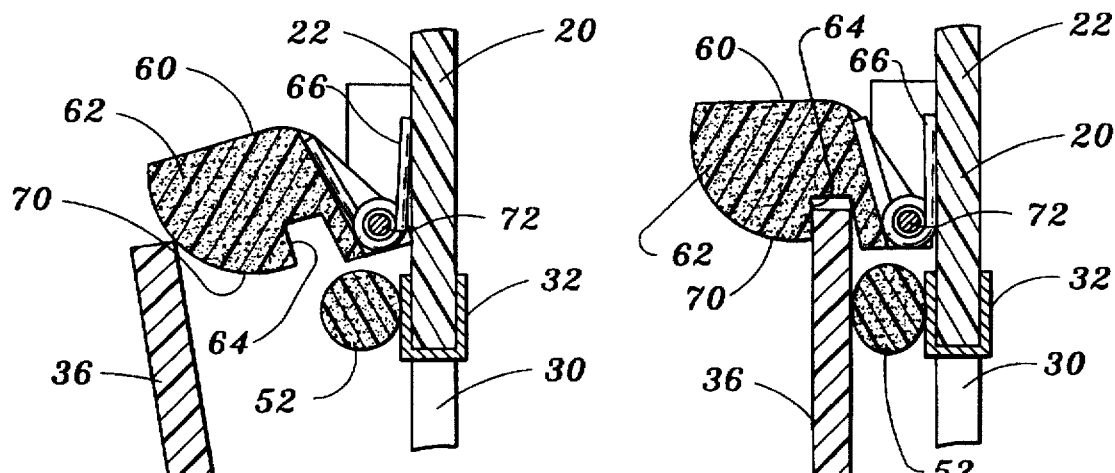
FIG. 11 is a greatly enlarged cross-sectional view taken along the line 11—11 in FIG. 6 and illustrating the top of the module window and the position assumed thereby relative to a clip when the module opening is being mounted in position on the frame member.
FIG. 12 is a view similar to FIG. 11 but illustrating the module window in place on the frame member.
Figure 13:
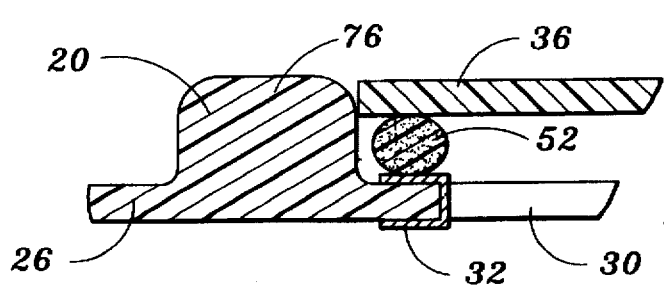
FIG. 13 is an enlarged cross-sectional view taken along the line 13—13 of FIG. 6.

After the bottom end of the module window 36 is placed on abutment surface 38 the module window is pivoted so that it is generally parallel with the plane of the window opening. FIGS. 11 and 12 illustrate the top end of the module window and the relative position assumed thereby with respect to the top frame element. FIG. 11 illustrates the module window being brought into place and FIG. 12 illustrates the top of the module window in seated secured position with the seal strip 52 compressed between the top frame element and the module window.

Connector means for securing the module window in place relative to the frame member includes a plurality of clips 60 secured to the top frame element at spaced locations along the top frame element. Each clip 60 includes a clip member 62 defining a downwardly extending notch 64 for receiving the top of the module window to secure the module window in position on the frame member.

A spring 66 cooperates with the clip member to continuously urge the clip member in a counter-clockwise direction as viewed in FIGS. 11 and 12. A cam surface 70 is located adjacent to the notch 64 and is engageable by the module window when the module window is being connected to the frame member to move the clip member against the bias exerted by the spring until the module window is in registry with the notch 64. At the time registration occurs, the top of the module window will enter the notch and be retained in position relative to the frame member as shown in FIG. 12, compressing seal strip 52 therebetween.

Clip member 62 has a throughbore accommodating a support pin 72 extending between two supports 74 screwed to or otherwise secured to the frame member 20. The support pin 72, of course, operates as the pivot for the clip member. The clip member may be disengaged from the top of the module window simply by grasping the clip member and rotating it against the urging of the spring 66 to remove the top of the module window from the notch 64.

The side frame elements 26 have abutment members 76 which are engageable with the sides of the module window to center the module window relative to the window opening. See FIGS. 6 and 13 in this regard.

Figure 14:
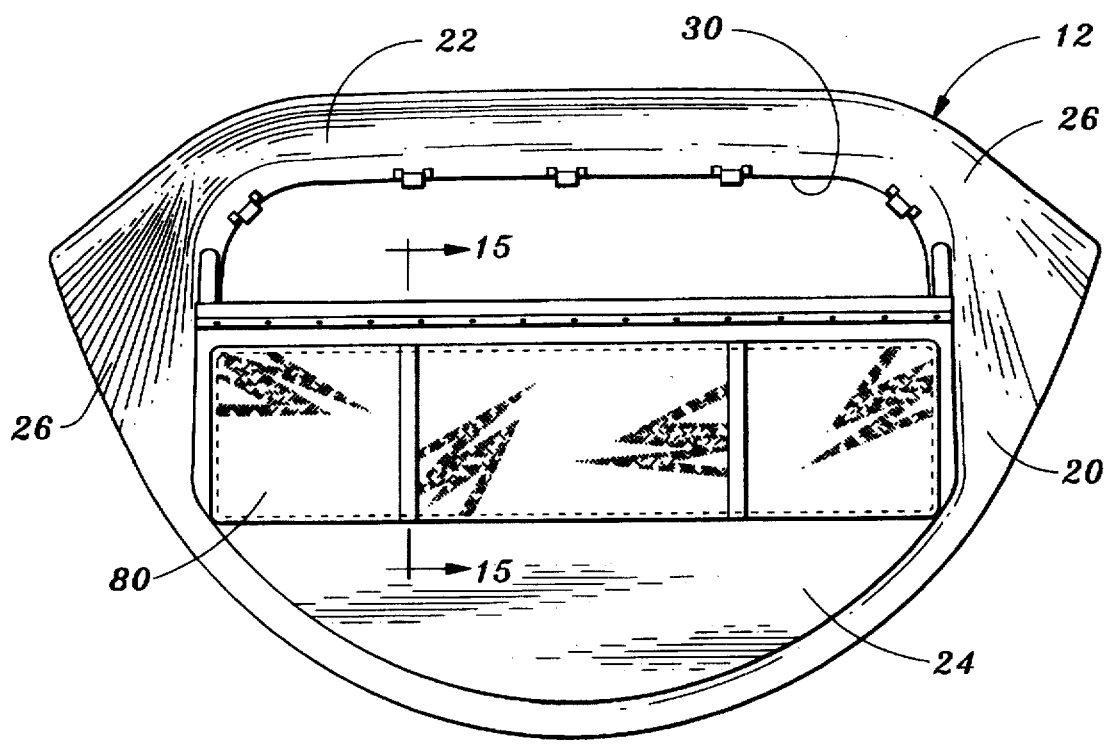
FIG. 14 is a bottom view of the replacement module and illustrating a module window storage pocket.
Figure 15:
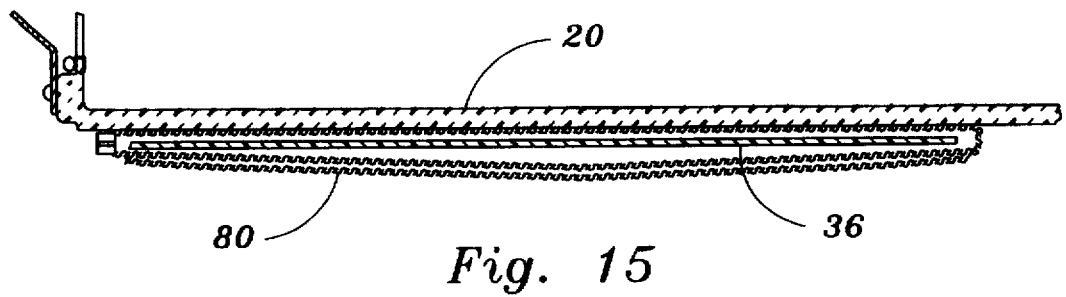
FIG. 15 is an enlarged cross-sectional view taken along the line 15—15 of FIG. 14.

As previously indicated, the module window 36 may be completely removed from the rest of the replacement module structure, thus allowing the window opening 30 to remain open. The present invention provides an arrangement for accommodating and protecting the modular window after it has been removed from its position wherein it covers the window opening. Referring now to FIGS. 14 and 15, a pouch or pocket 80 formed of woven fabric or the like is affixed to the frame member 20. The pocket defines an interior of sufficient size to accommodate the module window 36. If desired, a closure (not shown) may be utilized to close off the interior of the pocket if desired.

Figure 16:
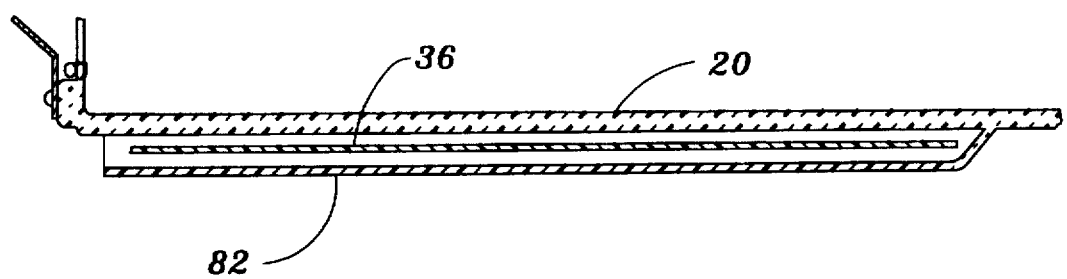
FIG. 16 is a view similar to FIG. 15 but illustrating an alternative embodiment of module window storage means.

FIG. 16 shows an alternative form of pocket 82 which is integrally molded with the frame member 20. Alternately, a rigid separate pocket could be attached to the frame member.

I claim:

1. A replacement module for replacing structure at the rear of an automobile, said structure at least partially comprising the rear window of the automobile, said replacement module comprising, in combination:

a substantially rigid frame member for attachment to an automobile body, said frame member having a top frame element, a bottom frame element, and two spaced side frame elements extending between said top frame element and said bottom frame element, said frame elements defining a window opening;

a module window selectively positionable on said frame member to cover said window opening; and connector means for releasably connecting said module window to said frame member with said module window covering said window opening, said replacement module defining an abutment surface engageable by the bottom of said module window to abut against and support said module window when said connector means connects said module window to said frame member with said module window covering said window opening, and said connector means including a retainer element extending upwardly from said abutment surface and disposed immediately adjacent thereto, said retainer element being spaced from and adjacent to said bottom frame element and defining a cavity therewith extending below the level of said window opening, said replacement module additionally comprising a resilient, deformable seal strip positioned in said cavity for engagement by said module window when said module window abuts and is supported by said abutment surface and covers said window opening.

2. The replacement module according to claim 1 wherein said module window is selectively completely removable from said frame member whereby said window opening is not covered by said module window, said replacement module additionally comprising means for accommodating and storing said module window.

3. The replacement module according to claim 2 wherein said means for accommodating and storing said module window comprises pocket defining means.

4. The replacement module according to claim 1 wherein said frame member is configured to replace an automobile rear window and has an outer periphery substantially corresponding in shape and size to the outer periphery of said automobile rear window.

5. The replacement module according to claim 1 wherein said frame member is configured to replace an automobile hatch back and has an outer periphery substantially corresponding in shape and size to the outer periphery of said automobile hatch back.

6. The replacement module according to claim 1 additionally comprising seal means extending substantially completely about said window opening, said seal means in substantially fluid-tight engagement with and sandwiched between said module window and said frame member when said connector means connects said module window to said frame member with said module window covering said window opening.

7. The replacement module according to claim 6 wherein said seal means comprises a resilient, deformable seal strip connected to said top frame element, said bottom frame element and said side frame elements closely adjacent to said window opening.

8. The replacement module according to claim 1 wherein said abutment surface is defined by said frame member.

9. The replacement module according to claim 1 wherein said retainer element includes a first retainer element segment extending substantially parallel to said module window at said cavity when said module window abuts and is supported by said abutment surface and covers said window opening and a second retainer element segment affixed to said first retainer element segment flaring outwardly away from said cavity and having a guide surface slanting toward said cavity to guide placement of said module window into said cavity.

10. The replacement module according to claim 1 additionally comprising two spaced abutment members engageable by the sides of said module window to center said module window relative to said window opening, one each of said abutment members located at a side frame element.

11. The replacement module according to claim 10 wherein said abutment members are integrally formed with said side frame elements.

12. A replacement module for replacing structure at the rear of an automobile, said structure at least partially comprising the rear window of the automobile, said replacement module comprising, in combination:

a substantially rigid frame member for attachment to an automobile body, said frame member having a top frame element, a bottom frame element, and two spaced side frame elements extending between said top frame element and said bottom frame element, said frame elements defining a window opening;

a module window selectively positionable on said frame member to cover said window opening; and connector means for releasably connecting said module window to said frame member with said module window covering said window opening, said connector means including clip means connected to said top frame element engaging the top of the module window when said module window covers said window opening to releasably clamp said module window to said frame member.

13. The replacement module according to claim 12 wherein said clip means comprises a plurality of clips secured to said top frame element at spaced locations along said top frame element.

14. The replacement module according to claim 12 wherein said clip means comprises at least one clip secured to said top frame element, said clip including a clip member defining a notch for receiving the top of said module window to secure said module window in position on said frame member and a spring continuously biasing said clip member toward said module window.

15. The replacement module according to claim 14 wherein said clip member includes a cam surface adjacent to said notch engageable by a module window when said module window is being connected to said frame member to move said said clip member against the bias exerted by said spring until said module window is in registry with said notch.

16. The replacement module according to claim 14 additionally comprising a resilient, deformable seal strip between said window opening and said clip member for sandwiching between said module window and said top frame element.

17. The replacement module according to claim 14 wherein said at least one clip additionally comprises clip member supports disposed at the sides of said clip member.

18. The replacement module according to claim 17 wherein said clip member defines a throughbore, said at least one clip additionally comprising a support pin extending between said clip member supports and through said throughbore whereby said clip member is pivotally mounted on said support pin.

* * * * *